Nov. 15, 1938.   R. T. FIELDS   2,136,422

POLYMERIZATION

Filed June 2, 1937

Reuben T. Fields   INVENTOR.

BY   J. M. Castle Jr.

ATTORNEY.

Patented Nov. 15, 1938

2,136,422

UNITED STATES PATENT OFFICE 2,136,422

POLYMERIZATION

Reuben T. Fields, Arlington, N. J., assignor to E. I. du Pont de Nemours & Company, Wilmington, Del., a corporation of Delaware Application June 2, 1937, Serial No. 145,933

8 Claims. (Cl. 18—55)

This invention relates to polymerization and, more particularly, to a process of polymerizing organic compounds in elongated shapes such as rods, tubes, sheets, and the like.

The polymerization of certain organic liquid compounds into rods, tubes, sheets, and other primary shapes from which articles may be fabricated by machining processes, as well as the polymerization of such compounds in finished shapes, is known. This invention relates to improvements in such processes where applied to organic compounds that are polymerizable to at least fairly hard solid shapes suitable for use as "turnery resins" and which, in the course of the polymerization reaction, release considerable heat and undergo appreciable shrinkage; the term "polymerizable organic compounds" as used throughout the specification is intended to mean a compound of this character.

Polymerizable organic compounds are readily polymerized upon the application of heat, either in the presence or absence of a catalyst for the polymerization reaction, to a relatively hard solid body but, because the reaction of polymerization involves appreciable shrinkage, (i. e., the solid polymer is denser than the liquid monomer), the polymerization of the monomeric compounds in molds, a species of casting and not of heat and pressure molding, to give a flawless product of the full cross section of the mold, has involved great difficulty.

An object of the present invention is to provide a simple and economical process of producing flawless objects of polymerized organic compounds in elongated shapes. A further object is to provide a process wherein molds of light, simple construction may be used. Other objects of the invention will be apparent from the description given hereinafter.

The above objects are accomplished according to the present invention by introducing into a substantially vertically positioned elongated mold closed at the lower end a plurality of portions of a liquid composition comprising a monomeric polymerizable organic compound, the portions containing successively diminishing proportions of a polymerization catalyst and the initial viscosity of the liquid composition being sufficient to prevent any substantial commingling of successive portions thereof, and subjecting said composition to heat and simultaneously to pressure.

The invention is based upon recognition of the fact that organic compounds of the type under consideration may be polymerized without the development of flaws due to local areas of excessive temperature or to shrinkage, provided that the polymerization at any time is confined to a narrow zone or layer. The present invention depends further upon providing, adjacent to the zone in which the polymerization is proceeding, a mass of incompletely polymerized material in a flowable condition so that it is capable of moving toward and into the zone of polymerization to compensate for the shrinkage accompanying the polymerization going on in the zone.

The invention will be described more specifically with reference to the accompanying drawing wherein.

Figures 1, 2, 3, 4:
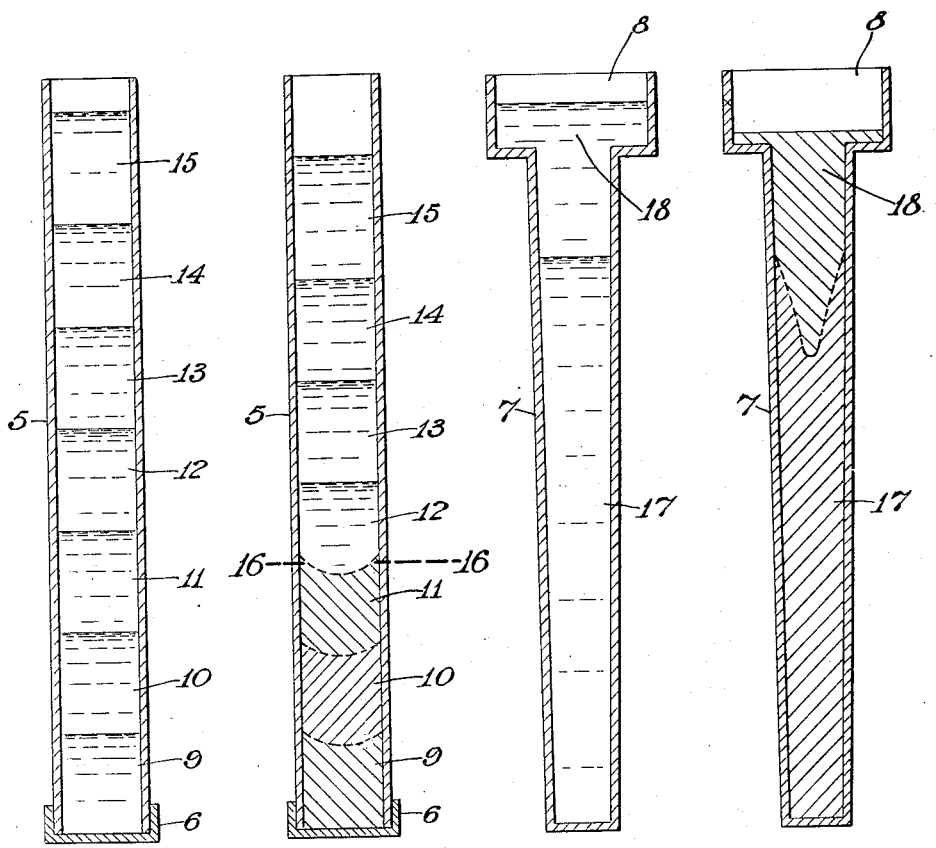
Fig. 1 is a diagrammatic vertical section along the axis of a cylindrical mold adapted for carrying out the present invention and showing the contents of the mold at the beginning of the process.
Fig. 2 is a view similar to Fig. 1 but illustrating the condition of the contents of the mold at an intermediate stage of the process.
Fig. 3 is a diagrammatic vertical section along the axis of a mold of another form suitable for carrying out the present invention and showing the contents of the mold at the beginning of the process.
Fig. 4 is a view similar to Fig. 3 but illustrating the contents of the mold at the conclusion of the process.

In the following example, illustrating a specific embodiment of the invention, reference is made to Figs. 1 and 2 of the drawing:

*Example 1.*—In Figs. 1 and 2 reference numeral 5 represents a piece of drawn aluminum tubing which, with an end cap 6, forms a mold. The inside diameter of the mold is 0.875" and its height is 11.5".

Into this mold held in substantially vertical position is poured a portion 9 of a syrup prepared by heating monomeric methyl methacrylate at 78° C. for about 2½ hours. This portion 9 of the syrup contains 0.1%, by weight thereof, of benzoyl peroxide as a polymerization catalyst. There is then poured into the mold a section portion 10 of the syrup of the same viscosity but containing only one-half as much benzoyl peroxide, i. e., 0.05%. Then subsequent portions 11, 12, 13, 14, and 15 are successively poured into the mold, each portion containing one-half the amount of catalyst contained in the portion below it. That is, portion 11 contains 0.025%; portion 12, 0.0125%; portion 13, 0.006%; portion 14, 0.003%, and portion 15, 0.0015% of benzoyl peroxide.

The viscosity of the syrup is sufficiently high so that commingling of the successive portions in the mold is substantially prevented and the portions are, accordingly, separated from each other by a relatively distinct line of division, as indicated diagrammatically in Fig. 1.

The mold thus loaded is placed in vertical position in a suitable autoclave, not shown in the drawing, and subjected therein to a temperature of 75–80° C. and a pressure of 175 pounds per square inch furnished by nitrogen gas.

The temperature and catalyst cause polymerization of the mass to proceed, polymerization being most rapid in portion 9 due to its greater catalyst content. As polymerization proceeds in this portion 9, it is accompanied by a shrinkage in volume which tends to cause the formation of corresponding voids in the mass. However, at the time of the shrinkage in portion 9, the material in the portion 10 is still flowable and, with the assistance of the pressure exerted upon the free surface of the syrup at the top of the mold, the body of flowable liquid progresses downward to compensate for the shrinkage taking place. By the time polymerization is relatively complete in the portion 9, the next portion 10 is beginning to harden and its shrinkage in volume is in like manner compensated by the flow of syrup from the still flowable portion 11.

Fig. 2 represents the condition of the contents of the mold at an intermediate stage in the process, polymerization having proceeded from portion to portion up to the level 16—16 with polymerization actively under way in the next portion 12 above the level 16—16. The top level of the material in the mold, i. e., the free surface of portion 15, has become lowered by the amount of shrinkage which has taken place during polymerization of the portions 9, 10, and 11.

The portions 9, 10, and 11, which have become completely polymerized at this stage of the process, form a continuous integral mass of the full cross section of the mold. Actually, there are no visible interfaces between these portions although the portions are diagrammatically indicated by broken lines. As the broken lines indicate, these interfaces are of conical or parabolic configuration due to the fact that the heat developed by the polymerization is conducted by the walls of the mold to an extent sufficient to cause the zone of polymerization to advance slightly more rapidly along the periphery of the mass than along its axis.

Polymerization progresses throughout the remaining portions of the syrup in the tube in the manner described with respect to portions 9 and 10, the relatively flowable or liquid material above the zone undergoing active polymerization constantly moving downward to compensate for shrinkage. Ultimately, the entire amount of polymerizable syrup in the mold becomes fully polymerized to form a continuous integral rod, free from any visible interfaces between the respective portions and also having the full cross section of the mold cavity. The length of the rod, i. e., its height in the mold, will be less than the height of the syrup originally poured into the mold by the amount corresponding to the shrinkage caused by polymerization. In the present example, polymerization of the last portion 15, and hence complete polymerization of the whole mass, will be finished at the end of about ten hours and the shrinkage will have reduced the height of the material in the mold from the 10.5″ originally poured to approximately 8″.

The mold and contents are then removed from the autoclave and allowed to cool to room temperature. The end cap 6 is then unscrewed from the tubular portion 5 of the mold and the finished rod tapped out of the latter. The rod obtained is transparent and homogeneous in appearance and its surface duplicates that of the interior of the mold.

As a matter of practical procedure, it is convenient to prepare the proportions of successively less catalyst by dilution of an original lot containing a definite amount of catalyst with syrup free of catalyst.

Practically, there is a limit to the vertical height of the individual portions that may be used in the mold. The present process depends upon a gradient in the catalyst content of the material as originally loaded into the mold and this gradient, from bottom to top of the mold, must be a substantial one in order that active polymerization may at all times be limited to a shallow layer while the material above remains capable of moving downward to compensate for shrinkage. Each individual portion of syrup in the mold constitutes, in effect, a mass of material having no such vertical gradient and, if its vertical height is too great, there will be a tendency for polymerization to be active in too thick a layer at one time, voids and flaws in the finished product resulting therefrom. It has been found advisable to limit the vertical height of the individual portions in the mold to not more than about 2″. Thus, in a mold 11″ high, there should be not fewer than six portions of syrup.

The limitation on the height of individual portions is, however, determined in part by the magnitude of the pressure maintained upon the mass. With higher pressures, the height of the portions may safely be increased somewhat; with lower pressures, it must be reduced.

It is an important feature of the present invention to prevent the development of convection currents during polymerization by the use of a polymerizable syrup of substantial viscosity. This syrup may be made either by partially polymerizing monomer prior to its introduction into the mold or by dissolving polymer in monomer. It has been found that a syrup having at least a viscosity of a syrup obtained by dissolving five parts of polymerized methyl methacrylate in 95 parts of monomeric methyl methacrylate, represents about the minimum viscosity desirable.

Those skilled in the art will understand that a proper balance must be maintained between the viscosity and the catalytic content of the polymerizable material, the temperature to which it is exposed in the course of the process and the pressure to which it is subjected. The effect of increasing the temperature and of increasing the catalytic influence are both in the direction of speeding up the polymerization. The rate of polymerization governs the tendency of the mass to develop bubbles. Since this formation of bubbles can be prevented by the application of suitable pressure, it will be evident that the greater the content of catalyst present in the bottommost position, which is the first to polymerize, the lower the temperature should be at a given pressure and that, in so far as the rate of polymerization is increased through the influence of either catalyst or temperature, or both, the pressure which must be applied to prevent the formation of bubbles, must also be increased.

To illustrate, if instead of the 0.1% of benzoyl peroxide in the first portion of syrup, as used in Example 1, there were to be used 0.2% with each successive portion containing one-half of the concentration of its predecessor, the temperature to be applied, under a pressure of 175 pounds per square inch, should not exceed about 60° C., instead of the 75–80° C. which can safely be used when the maximum content of catalyst is 0.1%.

Pressures upon the polymerizable material between about 150 and 200 pounds per square inch will ordinarily be found preferable. Pressures as low as 50 pounds per square inch may be used but are less desirable as the heights of the individual portions must be correspondingly reduced. Although pressures in excess of 200 pounds per square inch permit an increase in the height of the individual portions, they are likely to be less desirable practically because of the requirement that the pressure vessel be correspondingly stronger.

The present invention may be used advantageously in combination with that set forth in copending application Serial No. 145,934, entitled "Polymerization process," filed of even date herewith in the name of the present applicant and Charles M. Fields. According to this latter invention, the limitation of active polymerization to a shallow layer, the downward movement of material to compensate for shrinkage, and the progress of active polymerization from the bottom to the top of the mass are brought about by subjecting the contents of the mold to temperatures gradually decreasing from the bottom upwards while simultaneously applying pressure thereto. This is effected by applying heat to the bottom only of a metal mold loaded as already described in the present specification. By the use of this combined procedure, instead of applying heat uniformly throughout the height of the mold, the limitation of the height of the individual portions loaded into the mold in accordance with the present invention may be relaxed. This combined procedure may be applied feasibly to molds of a height in excess of 15″.

In the following example, wherein reference is made to Figs. 3 and 4 of the drawing, is illustrated an embodiment of the present invention combined with the procedure of the above mentioned application:

*Example 2.*—A mold 7 is formed in one piece by immersing a steel master mold into a molten alloy of 97% lead and 3% tin and withdrawing it with a layer of the latter frozen over it, which layer when stripped off from the steel mold forms a one piece mold designated by reference numeral 7.

This mold is tapered, to form a tapered ornamental handle for a mirror, and has an enlarged top portion 8 which enables it to hold a reserve of liquid without unduly increasing its vertical height.

The mold 7 is filled to about three-fourths of its capacity with a methyl methacrylate syrup containing 0.04% of benzoyl peroxide. This portion of syrup is designated by reference numeral 17. Thereafter there is poured into the mold a quantity of similar syrup containing no catalyst and this is designated by reference numeral 18 in Fig. 3 of the drawing, the amount of this latter portion being sufficient to extend up into the top portion 8 of the mold to a height great enough to provide material to compensate for shrinkage during polymerization in the main body of the mold.

This mold is placed in vertical position in an autoclave, where the bottom of the mold only is exposed to a temperature of 65° C., a pressure of 150 pounds per square inch, provided by nitrogen gas, being exerted upon the free surface of the syrup at the top of the mold.

Polymerization takes place first in the portion 17 due to its catalyst content and progresses throughout the mold as described in Example 1 except that the polymerization is conducted only in two portions which are of relatively greater height due to the fact that heat is being applied only to the bottom of the mold. At the conclusion of sixteen hours, polymerization is complete. As shown in Fig. 4, the main body of the mold is completely filled to its full cross section with polymerized methyl methacrylate made up of the two portions designated by the reference numerals 17 and 18, with a slight excess of material at the bottom of the top portion 8. The interface of the two layers is indicated by a dotted line but it will be understood that actually no interface is visible.

The mass of polymerized methyl methacrylate after having been cooled to room temperature is tapped out of the mold.

It will be understood that the two examples given are merely illustrative and that procedural details may be varied widely without departing from the scope of the present invention.

The number of portions of polymerizable compound of different catalyst content may range from two upwards but there must be a substantial difference in the catalyst content of successive portions, each portion containing usually not more than half as much catalyst as the one below it. The present invention is not dependent upon any particular ratio of catalyst content in successive portions, provided that the difference is sufficient to prevent two or more portions of polymerizable compound undergoing active polymerization at the same time.

The temperature to which the polymerizable organic compound is to be heated in the course of polymerization must be selected in view of the particular compound in question and the conditions of pressure and of cross sectional dimension of the mold being used. Normally, the temperature will be permitted to rise high enough for polymerization to proceed at an economical speed but not so high as to involve the risk of overheating.

The present invention is applicable generally to polymerizable organic compounds, among which may be mentioned the following:

| | |
|---|---|
| Methyl methacrylate | Furfuryl methacrylate |
| Ethyl methacrylate | Ethyl methylene malonate |
| Butyl methacrylate | Methallyl methacrylate |
| Isobutyl methacrylate | Tetrahydrofurfuryl methacrylate |
| Secondary butyl methacrylate | Methacrylonitrile |
| Tertiary amyl methacrylate | Styrene |
| Phenyl methacrylate | Alpha methyl styrene |
| Glycol monomethacrylate | Vinyl acetate |
| Cyclohexyl methacrylate | Vinyl acetate-vinyl chloride |
| Para - cyclohexylphenyl methacrylate | Vinyl butyrate |
| | Vinyl chlorobenzene |
| Decahydro - beta - naphthol methacrylate | Vinyl naphthalene |
| | Vinyl ethinyl carbinol |
| Di-isopropyl carbinol methacrylate | Methyl vinyl ketone |
| | Dimethyl itaconate |

The above compounds may be used either alone or in admixture with each other.

While, per se, the following polymerizable organic compounds are not particularly well adapted for use in the present process, when mixed with methyl methacrylate or others of the compounds above, they give interpolymers which may be highly useful: glycol dimethacrylate, divinyl benzene, and methacrylic acid.

Vinyl chloride, a gas under atmospheric conditions, gives a polymer having useful properties as a turnery resin. This compound is a liquid under pressures of 50 pounds per square inch or so and may be used in the present process where conditions permit convenient handling of a compound of this nature.

The primary purpose of the present invention is the manufacture of turnery resins and the invention will not ordinarily be applied to the polymerization of compounds giving softer resins not generally suitable for turnery purposes. However, the invention is applicable to these softer resins also and, in some instances, it may be desirable to polymerize these resins in elongated shapes. Among the polymerizable organic compounds giving resins of this softer type may be mentioned:

Methyl acrylate
Ethyl acrylate
Butyl acrylate
Diethyl fumarate
Diethyl maleate
Divinyl ether.

Coloring matter, either soluble or insoluble, plasticizers, and various modifiers, and the like, may be mixed in the liquids to be polymerized. The selection and use of these various agents will be apparent to those skilled in the art. If a polymer is to be used for turnery purposes, it may be necessary or desirable to omit plasticizers.

In the specific examples, benzoyl peroxide has been used as the polymerization catalyst. The upper limit of concentration of this catalyst in the first portion of polymerizable syrup introduced into the mold is in the range of 0.15 to 0.25% by weight of the syrup and ordinarily not beyond 0.2%. The concentration in the portion of polymerizable compound containing the smallest percentage of catalyst will usually be from 0.0005%, by weight of the syrup, to none at all. Obviously, the use of other catalysts in place of benzoyl peroxide comes within the spirit of the present invention. Benzoyl peroxide is known as an exceptionally good catalyst for accelerating the polymerization of the type of compounds herein considered but catalysts such as acetyl peroxide and acetyl benzoyl peroxide may also be used, as well as other polymerization catalysts that are ordinarily satisfactory for general use with the organic compound being polymerized.

Although the invention has been described specifically as applied to making cylindrical rods, it is equally applicable to the formation of elongated bodies in shapes of other cross sections, including sheets whose thickness corresponding to one of the horizontal dimensions of the mold used, is small in proportion to the length of the sheet which corresponds to the vertical dimension of the mold.

The present invention is thus applicable for manufacturing in substantially finished form such articles as handles for mirrors, brushes, and the like, and blanks, slugs, blocks, and sheets adapted to be finished by various machining operations.

One advantage of the present invention is that it provides a simple and economical means of producing flawless turnery shapes from polymerizable organic compounds which heretofore have entered this field in only limited amounts because of the difficulty resulting from the large shrinkage accompanying their polymerization. A further advantage of the invention is that it can be carried out readily with simple and inexpensive apparatus and, with the control of the temperature involved in the process, can be put upon an automatic basis.

As many apparently widely different embodiments of this invention may be made without departing from the spirit and scope thereof, it is to be understood that the invention is not limited to the specific embodiments thereof except as defined in the appended claims.

I claim:

1. Process of polymerizing a liquid composition in elongated shapes which comprises introducing into a substantially vertically positioned elongated mold closed at the lower end a plurality of portions of the said liquid composition containing successively diminishing proportions of a polymerization catalyst, the viscosity of said liquid composition being sufficient to prevent any substantial commingling of successive portions thereof, and subjecting said composition to heat and simultaneously to pressure until said composition is polymerized to a solid body, the heat to which any of said portions of said liquid composition is subjected, not exceeding the heat to which any lower disposed portion of said liquid composition is subjected.

2. Process of polymerizing a liquid composition in elongated shapes which comprises introducing into a substantially vertical positioned elongated mold closed at the lower end a plurality of portions of the said liquid composition containing successively diminishing proportions of a polymerization catalyst, the viscosity of said liquid composition being sufficient to prevent any substantial commingling of successive portions thereof, and subjecting said composition in the mold to an external source of heat maintained at a temperature substantially uniform throughout the height of said mold and simultaneously to pressure until said composition is polymerized to a solid body.

3. Process of polymerizing a liquid composition in elongated shapes which comprises introducing into a substantially vertical positioned elongated mold closed at the lower end a plurality of portions of the said liquid composition containing successively diminishing proportions of a polymerization catalyst, the viscosity of said liquid composition being sufficient to prevent any substantial commingling of successive portions thereof, and applying heat from an external source to the bottom of the mold only and simultaneously subjecting said composition to pressure until said composition is polymerized to a solid body.

4. Process of polymerizing a liquid composition comprising monomeric methyl methacrylate in elongated shapes which comprises introducing into a substantially vertically positioned elongated mold closed at the lower end a plurality of portions of the said liquid composition containing successively diminishing proportions of a polymerization catalyst, the viscosity of said liquid composition being sufficient to prevent any substantial commingling of successive portions thereof, and subjecting said composition to heat and simultaneously to pressure until said composition is polymerized to a solid body, the heat to which any of said portions of said liquid composition is subjected, not exceeding the heat to which any lower disposed portion of said liquid composition is subjected.

5. Process of polymerizing a liquid composition comprising monomeric methyl methacrylate, in elongated shapes, which comprises introducing into a substantially vertically positioned elongated mold closed at the lower end, a plurality of portions of the said liquid composition containing successively diminishing proportions of benzoyl peroxide as a polymerization catalyst therefor, the viscosity of said liquid composition being sufficient to prevent any substantial commingling of successive portions thereof, and subjecting said composition to heat and simultaneously to pressure until said composition is polymerized to a solid body, the heat to which any of said portions of said liquid composition is subjected, not exceeding the heat to which any lower disposed portion of said liquid composition is subjected.

6. Process of polymerizing a liquid composition comprising monomeric methyl methacrylate, in elongated shapes, which comprises introducing into a substantially vertically positioned elongated mold closed at the lower end a plurality of portions of the said liquid composition containing successively diminishing proportions of benzoyl peroxide as a polymerization catalyst therefor, the viscosity of said liquid composition being sufficient to prevent any substantial commingling of successive portions thereof, and subjecting said composition in the mold to an external source of heat maintained at a temperature substantially uniform throughout the height of said mold and simultaneously to pressure until said composition is polymerized to a solid body.

7. Process of polymerizing a liquid composition comprising monomeric methyl methacrylate, in elongated shapes, which comprises introducing into a substantially vertically positioned elongated mold closed at the lower end a plurality of portions of the said liquid composition containing successively diminishing proportions of benzoyl peroxide as a polymerization catalyst therefor, the viscosity of said liquid composition being sufficient to prevent any substantial commingling of successive portions thereof, and applying heat from an external source to the bottom of the mold only and simultaneously subjecting said composition to pressure until said composition is polymerized to a solid body.

8. Process of polymerizing a liquid composition comprising monomeric methyl methacrylate, in elongated shapes, which comprises introducing into a substantially vertically positioned elongated mold closed at the lower end a plurality of portions of the said liquid composition containing successively diminishing proportions of benzoyl peroxide, the amount of benzoyl peroxide in the first portion introduced comprising not more than 0.25% by weight of said liquid composition, each portion forming a layer in the mold not exceeding 2" in height, and the viscosity of said liquid composition being sufficient to prevent any substantial commingling of successive portions thereof, and subjecting said composition to heat and simultaneously to a pressure of 150–200 pounds per square inch until said composition is polymerized to a solid body, the heat to which any of said portions of said liquid composition is subjected, not exceeding the heat to which any lower disposed portion of said liquid composition is subjected.

REUBEN T. FIELDS.